(12) United States Patent
Lee et al.

(10) Patent No.: US 9,673,613 B2
(45) Date of Patent: Jun. 6, 2017

(54) SURGE PROTECTION DEVICE

(71) Applicant: KEEPER TECHNOLOGY CO., LTD., New Taipei (TW)

(72) Inventors: Hsiem-Ming Lee, New Taipei (TW); Chun-Hsu Shen, New Taipei (TW)

(73) Assignee: KEEPER TECHNOLOGY CO., LTD., New Taipei (TW)

( * ) Notice: Subject to any disclaimer, the term of this patent is extended or adjusted under 35 U.S.C. 154(b) by 84 days.

(21) Appl. No.: 14/737,414

(22) Filed: Jun. 11, 2015

(65) Prior Publication Data
US 2016/0365725 A1  Dec. 15, 2016

(51) Int. Cl.
*H02H 3/20* (2006.01)

(52) U.S. Cl.
CPC .................. *H02H 3/202* (2013.01)

(58) Field of Classification Search
CPC ............ H02H 3/025; H02H 3/20–3/22; H02H 9/04–9/046; H01L 27/0248
See application file for complete search history.

(56) References Cited

U.S. PATENT DOCUMENTS

| | | | |
|---|---|---|---|
| 2002/0109952 A1* | 8/2002 | Rapsinski | H02H 9/042 361/86 |
| 2003/0076638 A1* | 4/2003 | Simonelli | G05F 1/571 361/56 |
| 2013/0265683 A1* | 10/2013 | Gueltig | G05F 1/56 361/86 |
| 2013/0335868 A1* | 12/2013 | Lamar | H02H 9/046 361/56 |
| 2014/0146426 A1* | 5/2014 | Murakami | H03K 19/00315 361/56 |

* cited by examiner

Primary Examiner — Stephen W Jackson
Assistant Examiner — Christopher Clark
(74) Attorney, Agent, or Firm — Ming Chow; Sinorica, LLC

(57) ABSTRACT

A surge protection device detects whether a surge voltage occurs at a power input port by using a first Zener diode and a second Zener diode. When the power input port receives a normal voltage, the surge protection device turns on a first transistor to transmit the normal voltage to a load. Otherwise, when the power input port receives the surge voltage, the surge protection device prohibits the first transistor from conducting so as to protect the load from being damaged by the surge voltage. The surge protection device protects the load by controlling conducting or not of the first transistor and is manufactured without a surge protection unit. Therefore, manufacturing cost of the surge protection can be decreased.

4 Claims, 4 Drawing Sheets

SURGE PROTECTION DEVICE

BACKGROUND OF THE INVENTION

1. Field of the Invention

The present invention relates to a surge protection device, and particularly to a surge protection device to avoid a surge voltage into a load.

2. Description of the Related Art

With reference to FIG. 3, a conventional surge protection device 30 comprises a power port Vin, a ground port GND, a rectifying diode D, a Zener diode ZD, a resistor R, a transistor Q, a positive port 31, a negative port 32, and a surge protection unit 33.

The rectifying diode D has an anode electrically connected to the power port Vin, and has a cathode electrically connected to the positive port 31. The surge protection unit 33 has a positive terminal electrically connected to the cathode of the rectifying diode D, and has a negative terminal electrically connected to the ground port GND. The Zener diode ZD has a cathode electrically connected to the positive terminal of the surge protection unit 33 and the cathode of the rectifying diode D, and has an anode electrically connected to the ground port GND through the resistor R.

When a surge voltage between the positive terminal and the negative terminal is greater than a threshold voltage of the surge protection unit 33, the surge protection unit 33 is conducting to transform electric power of the surge voltage to heat power for releasing the surge voltage.

The transistor Q has a gate electrically connected to the anode of the Zener diode ZD, has a source electrically connected to the ground port GND, and has a drain electrically connected to the negative port 32.

The positive port 31 and the negative port 32 are electrically connected to a load such as an LED device 40.

A normal voltage for the conventional surge protection device 30 is greater than a breakdown voltage of the Zener diode ZD and is smaller than the threshold voltage of the surge protection unit 33. When the power port Vin receives the normal voltage, the Zener diode ZD is conducting and the surge protection unit 33 is not conducting. After the Zener diode ZD is conducting, a current flows through the resistor R to generate a voltage across the resistor R. Since the voltage across the resistor can make the transistor Q conducting, the normal voltage can be provided to the LED device 40 through the transistor Q. The LED device 40 receives the normal voltage to emit light normally.

With reference to FIG. 4, the surge voltage is greater than the breakdown voltage of the Zener diode ZD and greater than the threshold voltage of the surge protection unit 33. When the surge voltage occurs, the surge protection unit 33 is conducting to release the surge voltage to protect the LED device 40 from being damaged.

When the surge protection unit 33 is conducting to protect the LED device 40, the surge protection unit 33 withstands the surge voltage. A capability of withstanding the surge voltage of the surge protection unit 33 is directly proportional to manufacturing cost of the surge protection unit 33. When the surge protection device 30 is designed for withstanding a great surge voltage, the manufacturing cost of the surge protection unit 33 and the surge protection device 30 is also raised.

SUMMARY OF THE INVENTION

An objective of the present invention is to provide a surge protection device that has decreased manufacturing cost.

To achieve the foregoing objective, the surge protection device comprises a rectifying diode, a first Zener diode, a second Zener diode, a first transistor, a second transistor, a third transistor, a first resistor, a first voltage division unit, and a second voltage division unit.

The rectifying diode has an anode electrically connected to a power input port, and has a cathode electrically connected to a cathode of the first Zener diode. The second Zener diode has a cathode electrically connected to the cathode of the rectifying diode.

The first transistor has a drain electrically connected to a power output port, has a source electrically connected to the cathode of the rectifying diode, and has a gate. The first resistor is electrically connected between the gate and the source of the first transistor.

The second transistor has a collector electrically connected to the gate of the first transistor, has an emitter electrically connected to a ground, and has a base.

The third transistor has a collector electrically connected to the base of the second transistor, has an emitter electrically connected to the ground, and has a base.

The first voltage division unit is electrically connected between the anode of the first Zener diode and the ground to divide a first voltage of the first Zener diode, and the first voltage division unit outputs the divided first voltage of the first Zener diode to the base of the second transistor.

The second voltage division unit is electrically connected between the anode of the second Zener diode and the ground to divide a second voltage of the second Zener diode, and the second voltage division unit outputs the divided second voltage of the second Zener diode to the base of the third transistor.

A first breakdown voltage of the first Zener diode is smaller than a second breakdown voltage of the second Zener diode.

A normal voltage is greater than the first breakdown voltage of the first Zener diode and smaller than the second breakdown voltage of the second Zener diode. When the power input port receives the normal voltage, the first Zener diode is conducting, and the first voltage of the first Zener diode is not zero.

Then, the first voltage division unit divides the first voltage of the first Zener diode, and outputs the divided first voltage of the first Zener diode to the base of the second transistor. The base of the second transistor receives the divided first voltage of the first Zener diode, and the emitter of the second transistor is grounded. Therefore, the collector and the emitter of the second transistor are conducting, and the normal voltage can be provided to the first resistor and the second transistor.

At the same time, a voltage between two terminals of the first resistor is not zero to make the drain and the source of the first transistor conducting. Therefore, the normal voltage can be output to a load electrically connected to the power output port.

A surge voltage is greater than the first breakdown voltage of the first Zener diode and the second breakdown voltage of the second Zener diode. When the power input port receives the surge voltage, the first Zener diode and the second Zener diode are conducting. The second voltage of the second Zener diode is not zero.

Then, the second voltage division unit divides the second voltage of the second Zener diode, and outputs the divided second voltage of the second Zener diode to the base of the third transistor. The base of the third transistor receives the divided second voltage of the second Zener diode, and the emitter of the third transistor is grounded. Therefore, the collector and the emitter of the third transistor are conducting.

The base of the second transistor is electrically connected to the collector of the third transistor. The base of the second transistor is grounded, because the collector and the emitter of the third transistor are conducting. The base and the emitter of the second transistor, and the collector and the emitter of the second transistor are not conducting.

The surge voltage cannot be provided to the first resistor and the second transistor. Further, the voltage between the two terminals of the first resistor is zero, and the drain and the source of the first transistor cannot be conducting. The load electrically connected to the power output port would not receive the surge voltage, thereby preventing the load from being damaged by the surge voltage.

The present invention is manufactured without a surge protection unit, and only comprises a few simple electronic units. Therefore, manufacturing cost of the surge protection device can be decreased.

Other objectives, advantages and novel features of the invention will become more apparent from the following detailed description when taken in conjunction with the accompanying drawings.

DETAILED DESCRIPTION OF THE INVENTION

Figure 1:
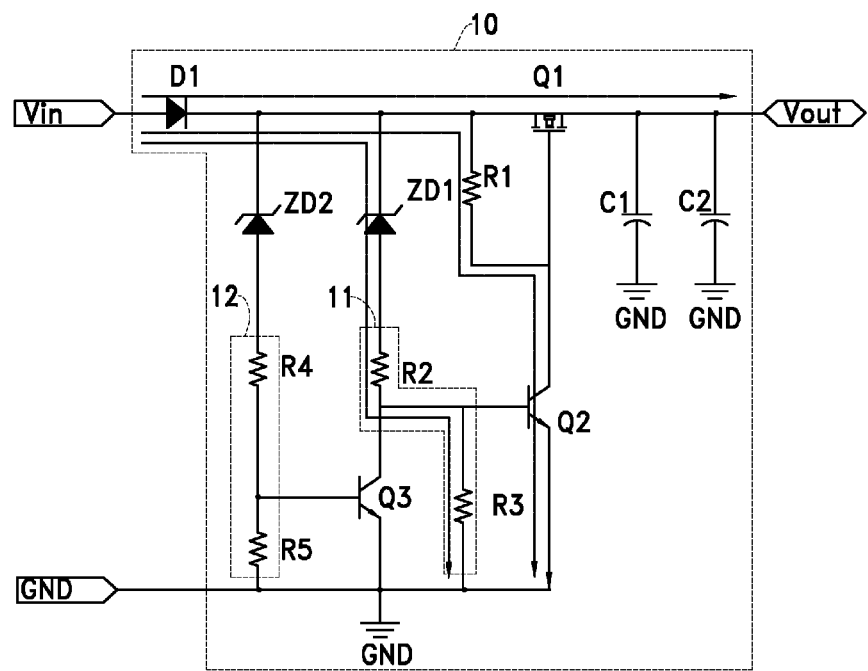
FIG. 1 is a circuit diagram of a surge protection device of the present invention when receiving a normal voltage.

With reference to FIG. 1, a surge protection device 10 of the present invention comprises a rectifying diode D1, a first Zener diode ZD1, a second Zener diode ZD2, a first transistor Q1, a second transistor Q2, a third transistor Q3, a first resistor R1, a first voltage division unit 11, a second voltage division unit 12, a power input port Vin, a power output port Vout, and a ground GND.

A first breakdown voltage of the first Zener diode ZD1 is smaller than a second breakdown voltage of the second Zener diode ZD2.

The rectifying diode D1 has an anode electrically connected to the power input port Vin and has a cathode.

The first Zener diode ZD1 has a cathode electrically connected to the cathode of the rectifying diode D1, and has an anode.

The second Zener diode ZD2 has a cathode electrically connected to the cathode of the rectifying diode D1, and has an anode.

The first transistor Q1 has a drain electrically connected to the power output port Vout, has a source electrically connected to the cathode of the rectifying diode D1, and has a gate.

The first resistor R1 is electrically connected between the gate and the source of the first transistor Q1.

The second transistor Q2 has a collector electrically connected to the gate of the first transistor Q1, has an emitter electrically connected to the ground GND, and has a base.

The third transistor Q3 has a collector electrically connected to the base of the second transistor Q2, has an emitter electrically connected to the ground GND, and has a base.

The first voltage division unit 11 is electrically connected between the anode of the first Zener diode ZD1 and the ground GND to divide a first voltage of the first Zener diode ZD1, and the first voltage division unit 11 outputs the divided first voltage of the first Zener diode ZD1 to the base of the second transistor Q2.

The second voltage division unit 12 is electrically connected between the anode of the second Zener diode ZD2 and the ground GND to divide a second voltage of the second Zener diode ZD2, and the second voltage division unit 12 outputs the divided second voltage of the second Zener diode ZD2 to the base of the third transistor Q3.

A normal voltage is greater than the first breakdown voltage of the first Zener diode ZD1 and smaller than the second breakdown voltage of the second Zener diode ZD2. When the power input port Vin receives the normal voltage, the first Zener diode ZD1 is conducting, and the second Zener diode ZD2 is not conducting. The first voltage of the first Zener diode ZD1 is not zero.

Therefore, the first voltage division unit 11 divides the first voltage of the first Zener diode ZD1, and outputs the divided first voltage of the first Zener diode ZD1 to the base of the second transistor Q2. The emitter of the second transistor Q2 is grounded, and the base of the second transistor Q2 receives the divided first voltage of the first Zener diode ZD1. The collector and the emitter of the second transistor Q2 are conducting, and then the normal voltage can be provided to the first resistor R1 and the second transistor Q2.

When the normal voltage is provided to the first resistor R1, a voltage between two terminals of the first resistor R1 is not zero, making the drain and the source of the first transistor Q1 conducting. Therefore, the normal voltage can be output to a load electrically connected to the power output port Vout.

Figure 2:
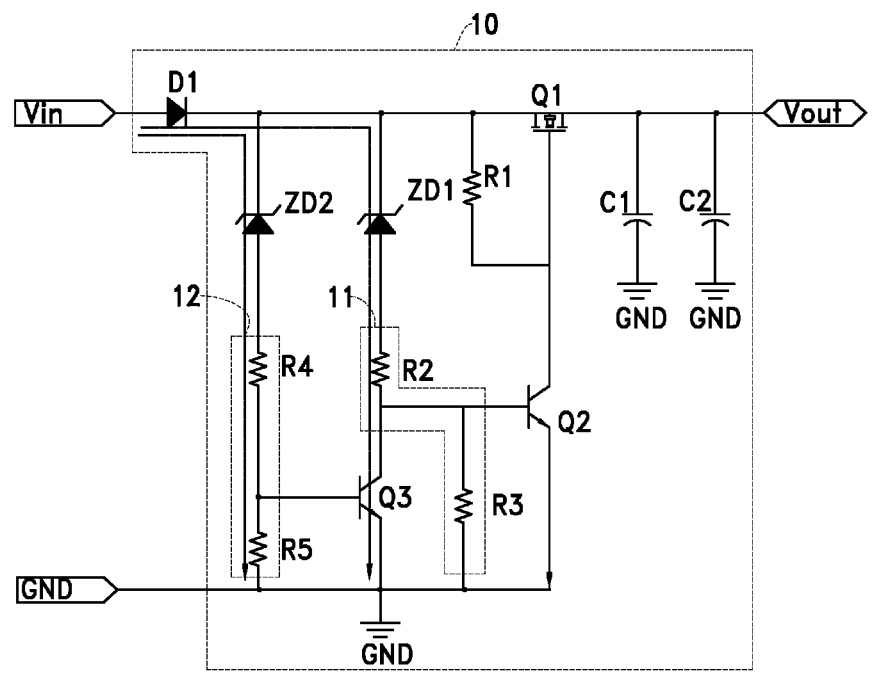
FIG. 2 is a circuit diagram of the surge protection device of the present invention when receiving a surge voltage.
Figure 3:
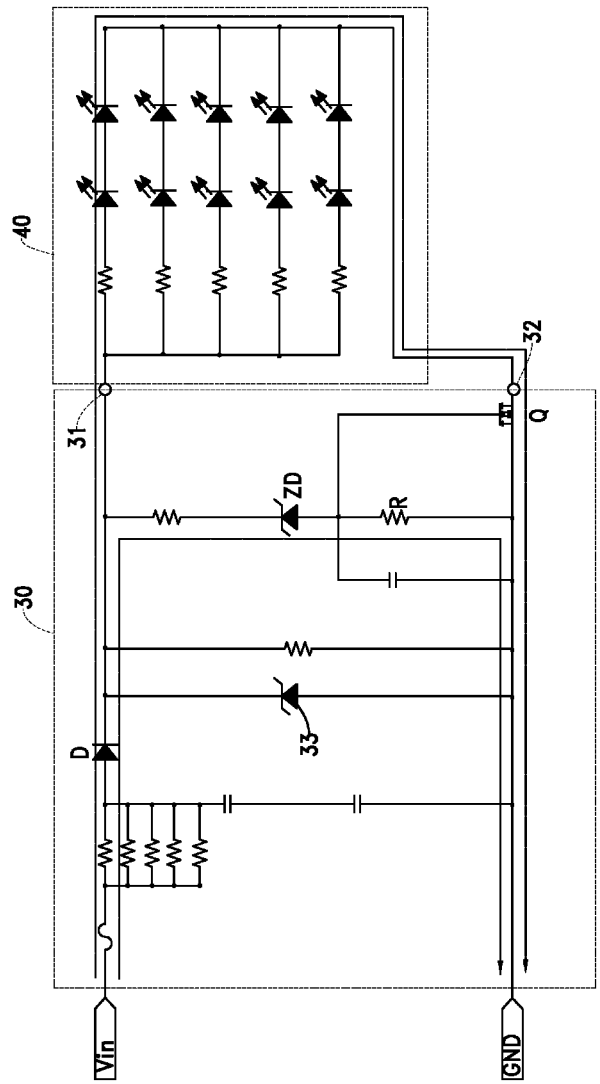
FIG. 3 is a circuit diagram of a conventional surge protection device when receiving a normal voltage.
Figure 4:
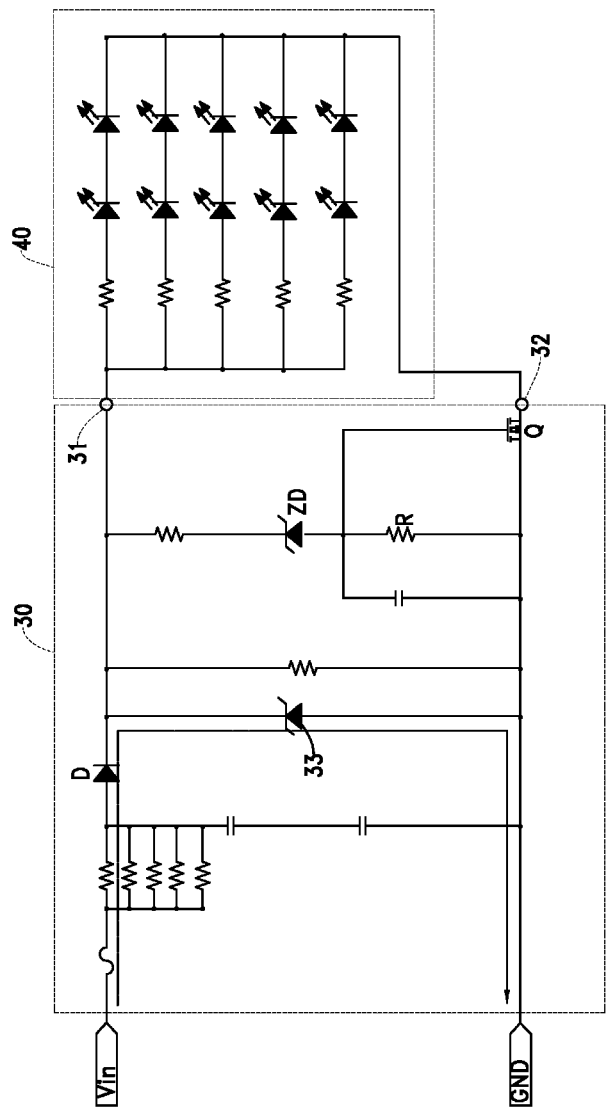
FIG. 4 is a circuit diagram of the conventional surge protection device when receiving a surge voltage.

With reference to FIG. 2, a surge voltage is greater than the first breakdown voltage of the first Zener diode ZD1 and the second breakdown voltage of the second Zener diode ZD2. When the power input port Vin receives the surge voltage, the first Zener diode ZD1 and the second Zener diode ZD2 are conducting. The first voltage of the first Zener diode ZD1 and the second voltage of the second Zener diode ZD2 are not zero.

Therefore, the second voltage division unit 12 divides the second voltage of the second Zener diode ZD2, and outputs the divided second voltage of the second Zener diode ZD2 to the base of the third transistor Q3. The emitter of the third transistor Q3 is grounded, and the base of the third transistor Q3 receives the divided second voltage of the second Zener diode ZD2.

The collector and the emitter of the third transistor Q3 are conducting, and the base of the second transistor Q2 is grounded according to the conducting third transistor Q3. The emitter and the base of the second transistor Q2 are grounded, and the second transistor Q2 is not conducting. The surge voltage cannot be provided to the first resistor R1 and the second transistor Q2. Therefore, the voltage between the two terminals of the first resistor R1 is zero, and the drain and the source of the first transistor Q1 cannot be conducting. The load electrically connected to the power output port Vout would not receive the surge voltage, thereby preventing the load from being damaged by the surge voltage.

The present invention can protect the load electrically connected to the power output port Vout from being damaged by the surge voltage. When the power input port Vin receives the surge voltage, the second Zener diode ZD2 is conducting to further make the first transistor Q1 not conducting. Then, the surge voltage received from the power input port Vin is not output to the load, thereby preventing the load from being damaged by the surge voltage.

The present invention is manufactured without a surge protection unit, and only comprises a few simple electronic units to prevent the load from being damaged by the surge voltage. Therefore, manufacturing cost of the surge protection device can be decreased.

The first voltage division unit 11 comprises a second resistor R2 and a third resistor R3. The second resistor R2 is electrically connected between the anode of the first Zener diode ZD1 and the base of the second transistor Q2. The third resistor R3 is electrically connected between the ground GND and the base of the second transistor Q2. The first voltage of the first Zener diode ZD1 can be divided by the second resistor R2 and the third resistor R3 electrically connected in series, and the divided first voltage of the first Zener diode ZD1 is output to the base of the second transistor Q2.

The second voltage division unit 12 comprises a fourth resistor R4 and a fifth resistor R5. The fourth resistor R4 is electrically connected between the anode of the second Zener diode ZD2 and the base of the third transistor Q3. The fifth resistor R5 is electrically connected between the ground GND and the base of the third transistor Q3. The second voltage of the second Zener diode ZD2 can be divided by the fourth resistor R4 and the fifth resistor R5 electrically connected in series, and the divided second voltage of the second Zener diode ZD2 is output to the base of the third transistor Q3.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A surge protection device, comprising:
    a rectifying diode having an anode electrically connected to a power input port, and having a cathode;
    a first Zener diode having a cathode electrically connected to the cathode of the rectifying diode, and having an anode;
    a second Zener diode having a cathode electrically connected to the cathode of the rectifying diode, and having an anode;
    a first transistor having a drain electrically connected to a power output port, having a source electrically connected to the cathode of the rectifying diode, and having a gate;
    a first resistor electrically connected between the gate and the source of the first transistor;
    a second transistor having a collector electrically connected to the gate of the first transistor, having an emitter electrically connected to a ground, and having a base;
    a third transistor having a collector electrically connected to the base of the second transistor, having an emitter electrically connected to the ground, and having a base;
    a first voltage division unit electrically connected between the anode of the first Zener diode and the ground to divide a first voltage of the first Zener diode, and outputting the divided first voltage of the first Zener diode to the base of the second transistor; and
    a second voltage division unit electrically connected between the anode of the second Zener diode and the ground to divide a second voltage of the second Zener diode, and outputting the divided second voltage of the second Zener diode to the base of the third transistor;
    wherein a first breakdown voltage of the first Zener diode is smaller than a second breakdown voltage of the second Zener diode.

2. The surge protection device as claimed in claim 1, wherein the first voltage division unit comprises:
    a second resistor electrically connected between the anode of the first Zener diode and the base of the second transistor; and
    a third resistor electrically connected between the ground and the base of the second transistor.

3. The surge protection device as claimed in claim 1, wherein the second voltage division unit comprises:
    a fourth resistor electrically connected between the anode of the second Zener diode and the base of the third transistor; and
    a fifth resistor electrically connected between the ground and the base of the third transistor.

4. The surge protection device as claimed in claim 2, wherein the second voltage division unit comprises:
    a fourth resistor electrically connected between the anode of the second Zener diode and the base of the third transistor; and
    a fifth resistor electrically connected between the ground and the base of the third transistor.

* * * * *